United States Patent [19]

Mayer

[11] Patent Number: 4,707,854
[45] Date of Patent: Nov. 17, 1987

[54] TELEPHONE WITH DIGIT CANCELLATION

[75] Inventor: Robert T. Mayer, Rye, N.Y.

[73] Assignee: U.S. Philips Corporation, New York, N.Y.

[21] Appl. No.: 552,652

[22] Filed: Nov. 17, 1983

[51] Int. Cl.⁴ .............................................. H04M 1/14
[52] U.S. Cl. .................................... 379/356; 379/355
[58] Field of Search .......... 179/90 B, 90 BB, 90 BD, 179/90 D, 90 K, 90 AN; 379/354, 355, 356, 357, 367

[56] References Cited

U.S. PATENT DOCUMENTS

Re. 31,649  8/1984  Brodbeck ......................... 179/90 B
3,920,926  11/1975  Lenaerts et al. ................... 179/90 B
4,090,037   5/1978  Benjamin et al. ............. 179/90 AN
4,160,879   7/1979  Sullivan et al. ................ 179/90 AN
4,277,651   7/1981  Fisher, II et al. ................ 179/90 B
4,304,968  12/1981  Klausner et al. .................... 179/6.02

FOREIGN PATENT DOCUMENTS 56-65556  3/1981  Japan .

Primary Examiner—Robert Lev
Attorney, Agent, or Firm—Robert T. Mayer

[57] ABSTRACT

An improvement in telephone equipment which enables a user to cancel the wrong digit of a misdialed number regardless of its position in the number without cancelling other digits in the number.

8 Claims, 2 Drawing Figures

TELEPHONE WITH DIGIT CANCELLATION

This is an invention in the telephone art. More particularly, it relates to apparatus which enables the correction of a misdialed number without the need to redial the entire number.

It is common for users of telephones to dial directly without the assistance of an operator. In the United States in direct dialing long distance numbers it is generally necessary to dial at least ten digits to make connection with a desired location. If a wrong digit is dialed it is necessary to begin all over again and redial the entire number.

It is an object of this invention to make it easier to use a telephone.

One of the advantages of the invention is that it enables a user of a telephone to correct a misdialed digit of a number without redialing the entire number regardless of the position of the digit in the number.

One of the features of the invention is the provision of a cancellation button on a telephone to enable the cancellation of a digit in a dialed number.

In accordance with the invention there is provided an improvement in a telephone system in which connections are made between telephone instruments located at different locatios. Each instrument is assigned a unique number including a plurality of digits. The system includes input means associated with each instrument and operable by a user to generate a separate signal for each of the digits. In order to make connection between two instruments a user of one instrument generates in series each of the signals associated with the digits assigned to the second of the instruments. The improvement comprises cancellation means associated with each of prescribed ones of said instruments and operable by a user during the serial generation of a plurality of signals to cancel a predetermined one of said signals regardless of its position in the series.

Other objects, features and advantages of the invention will be apparent from the following description and appended claims when considered in conjunction with the accompanying drawing in which:

A push button telephone instrument incorporating storage registers and control circuitry which enables a completed telephone number to be stored and subsequently transmitted after all the push buttons associated with a telephone number have been operated in the appropriate sequence is known per se. The digits of the telephone number are stored in binary code in storage registers. For transmission, the binary codes are translated into the appropriate form—typically in the form of dial-type impulses—and transmitted automatically together with the appropriate interdigit pauses between the train of pulses. As known, alternative coded forms such as binary codes, frequency codes, etc. may be used for transmitting the number to the exchange. In this way, all the advantages of rapid push button telephone operation may be gained on existing telephone exchanges without the necessity for modifying or adding to the existing equipment at the telephone exchange. In the embodiment described herein, the function and operation are explained in relation to the above-mentioned push button telephone instrument for the purposes of simplicity and clarity, but it will be apparent to any person skilled in the art that if any changes are needed in the equipment as shown to enable it to function in combination with any other telephone instrument incorporating digit storage and transmission means then such changes will be of an obvious nature.

Figure 1:
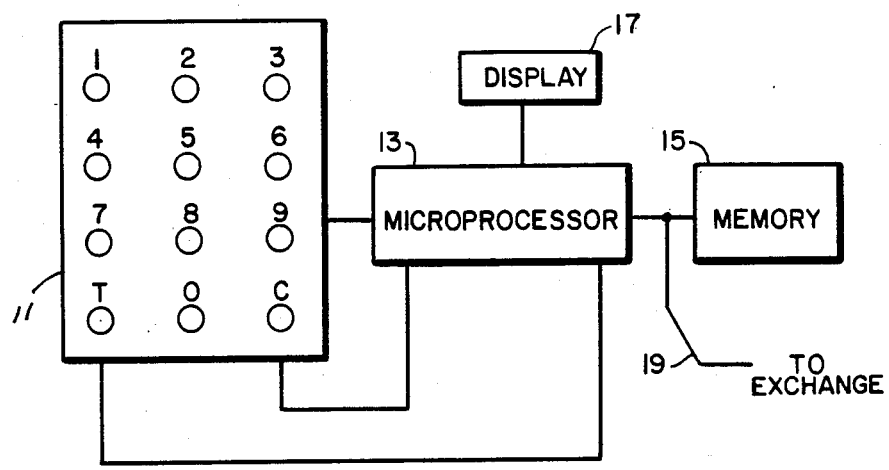
FIG. 1 is block diagram of the elements of the invention.

Referring now to FIG. 1 of the drawing, there is shown a typical keyboard 11 with twelve push buttons identified as 0, 1 through 9, T and C. Each of these buttons is connected to microprocessor 13 which operates with its associated memory 15. Microprocessor 13 is also connected to display 17 and through an appropriate telephone line 19 to the telephone exchange. The capacity of microprocessor 13 and memory 15 depends upon the number of digits it is desired to store which, in turn, typically would depend on the maximum number of digits in the telephone numbers to be dialed. It is presently considered that a 16-digit number would be sufficient for most applications. A 4-bit microprocessor with appropriate first-in, first-out registers is sufficient to handle 16-digit numbers.

The buttons on keyboard 11 are provided to input the digits 0, and 1 through 9 of any telephone number. Button C is connected to an input/output port of microprocessor 13 in order to effect the cancellation of the last number stored in memory 15. Transmission button T is connected to another input/output port of microprocessor 13 in order to cause the microprocessor to output a stored telephone number in the appropriate format with appropriate interdigit pauses to the telephone exchange.

Display 17 is utilized to display in a format readable from left to right the numbers in memory 15 corresponding to the telephone number being keyed in through keyboard 11. Any common display device would be suitable, although a liquid crystal display such as that utilized by many well known types of pocket calculators is preferred. In a preferred embodiment of the invention, keyboard 11, microprocessor 13, memory 15, and display 17 are all integral parts of the same telephone instrument.

Figure 2:
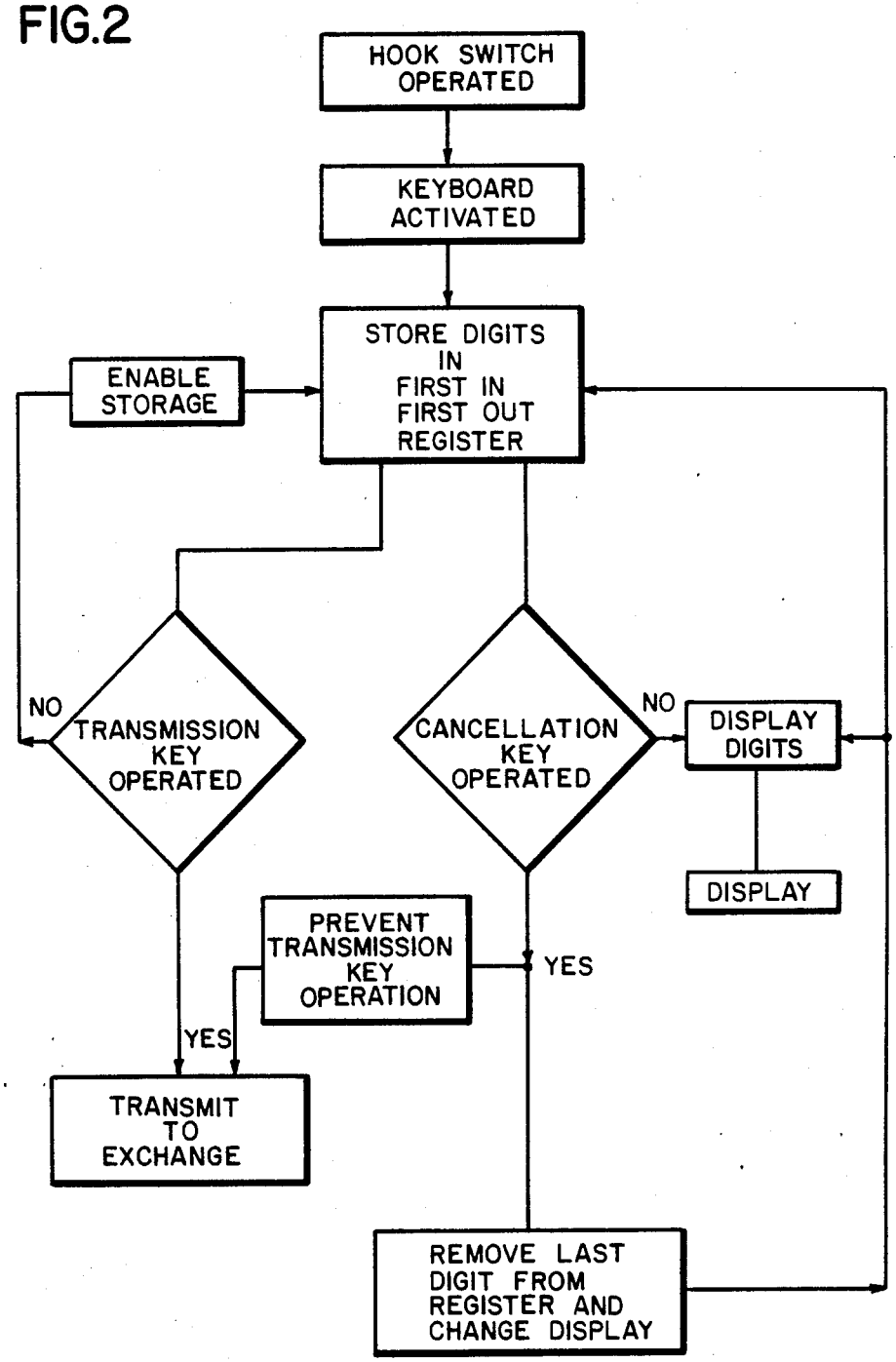
FIG. 2 is a flow chart of the operations of the elements shown in FIG. 1.

In FIG. 2 it can be seen that when the hookswitch of a telephone instrument adapted to practice the invention is operated, keyboard 11 is activated. Operation of any of the buttons 0 and 1 through 9 causes the signals corresponding to the associated digits to be stored in a first-in, first-out register comprising memory 15. As long as transmission key or button T is not operated, the storage of signals corresponding to inputted numbers is continuously enabled. While cancellation key or button C is unoperated, the display is enabled and the number being dialed can be read out from the display. If cancellation key C is operated, it causes the removal of the last entered digit from memory 15. This causes a change in the display so that it thereafter displays only those numbers dialed prior to the cancelled or removed number. The operation of button C also prevents transmission to the exchange notwithstanding transmission key T may be operated. Otherwise, when transmission key T is operated, a dialed and stored number is transmitted to the exchange.

In operation, a user of keyboard 11 would input a desired telephone number in the usual manner. Should this be done correctly, he pushes the transmission key T at the end of dialing and the number dialed is transmitted to the exchange by microprocessor 13. If in the course of dialing an incorrect digit is entered, the user presses cancellation key C immediately after such entry.

This causes microprocessor 13 to remove the last entered digit from the first-in, first-out register of memory 15. This causes the display to discontinue displaying this digit. The user could then enter the correct digit and continue dialing to completion.

While a display is shown in the preferred embodiment, this is for convenience only. It is to be understood that such a display is not necessary and that the advantages of the invention could be enjoyed notwithstanding a display is not provided.

It should be apparent that various modifications of the above will be evident to those skilled in the art and that the arrangement described herein is for illustrative purposes and is not to be considered restrictive.

What is claimed is:

1. In a telephone system in which connections are made between telephone instruments located at different locations by assigning each instrument a unique number including a plurality of digits, said system including input means associated with each instrument and operable by a user to generate a separate signal for each of said digits in order to make connection between two instruments by having a user of one instrument generate in series each of the signals associated with the digits assigned to the second of said instruments, cancellation means associated with each of prescribed ones of said instruments and operable by a user during the serial generation of a plurality of said signals to cancel a predetermined one of said signals regardless of its position in the series, memory means associated with each of said prescribed instruments for storing the signals associated with the digits assigned to another of said instruments, and transmission means associated with each of said prescribed instruments and operable to cause said memory means to transmit its stored signals, said concellation means when operated preventing the transmission of stored signals notwithstanding said transmission means is operated.

2. In a telephone system according to claim 1, wherein the predetermined one of said signals is the last generated one.

3. A telephone system according to claim 2, including a display associated with each of said prescribed instruments for displaying each of the digits associated with the signals generated by a user in attempting to make connection between the instrument he is using and another instrument in the system.

4. A telephone instrument for use in a telephone system, said instrument including a keyboard with a plurality of buttons one for each of the digits used in assigning telephone numbers, cancellation means, memory means for storing the digits of a telephone number in the order in which their associated buttons have been pressed, further means operable in response to the operation of said cancellation means for removing from said memory means a predetermined one of said stored digits regardless of its position in its associated telephone number and transmitting button operable to effect a transmission of a telephone number stored in said memory to said telephone system, said cancellation means when operated preventing said transmission notwithstanding said transmitting button is operated.

5. A telephone instrument according to claim 4, wherein the predetermined one of said stored digits the cancellation means removes is the last one stored.

6. A telephone instrument according to claim 5, wherein said cancellation means is a button on said keyboard.

7. A telephone instrument according to claim 6, wherein said further means is a microprocessor.

8. A telephone instrument according to claim 7, including a display for displaying the number stored in said memory.

* * * * *